United States Patent [19]

Hjelle et al.

[11] 3,896,935

[45] July 29, 1975

[54] INTEGRATED CIRCUIT HANDLER

[75] Inventors: Harold N. Hjelle, New Brighton;
Jack S. Soebbing, St. Paul, both of Minn.

[73] Assignee: Ramsey Engineering Company, St. Paul, Minn.

[22] Filed: Nov. 26, 1973

[21] Appl. No.: 418,990

[52] U.S. Cl. ............... 209/73; 221/295; 324/158 T; 209/81
[51] Int. Cl. ............................................ B07c 5/344
[58] Field of Search ......... 209/73, 74, 74 M, 81, 75; 324/158 D, 158 F, 158 T; 221/92, 294, 295

[56] References Cited
UNITED STATES PATENTS

| | | | |
|---|---|---|---|
| 2,975,878 | 3/1961 | Cason .............................. | 209/81 R |
| 3,028,959 | 4/1962 | Clark et al. ...................... | 208/81 R |
| 3,198,330 | 8/1965 | Wiesler et al. ................... | 209/81 R |
| 3,587,852 | 6/1971 | Kamm .............................. | 209/81 R |
| 3,662,881 | 5/1972 | Fineran ............................ | 209/81 R |
| 3,727,757 | 4/1973 | Boissicat .......................... | 209/81 |

*Primary Examiner*—Allen N. Knowles
*Attorney, Agent, or Firm*—Dugger, Johnson & Westman

[57] ABSTRACT

An Integrated Circuit Handler which positions integrated circuit chips to be tested, provides an indication that the circuit chip is in position to be tested, and has sorting mechanism responsive to separate test signals which comprise the results of tests performed on the integrated circuit to determine whether it is functioning properly. When a test signal has been received the handler will release the circuit, and sort it into one of five different storage tubes or magazines. The handler itself is primarily mechanical in nature, and utilizes test control circuitry provided by the customer to test the individual integrated circuits. The unit is made so it will accept integrated circuits of different body length, upon mere selection by the operator.

6 Claims, 13 Drawing Figures

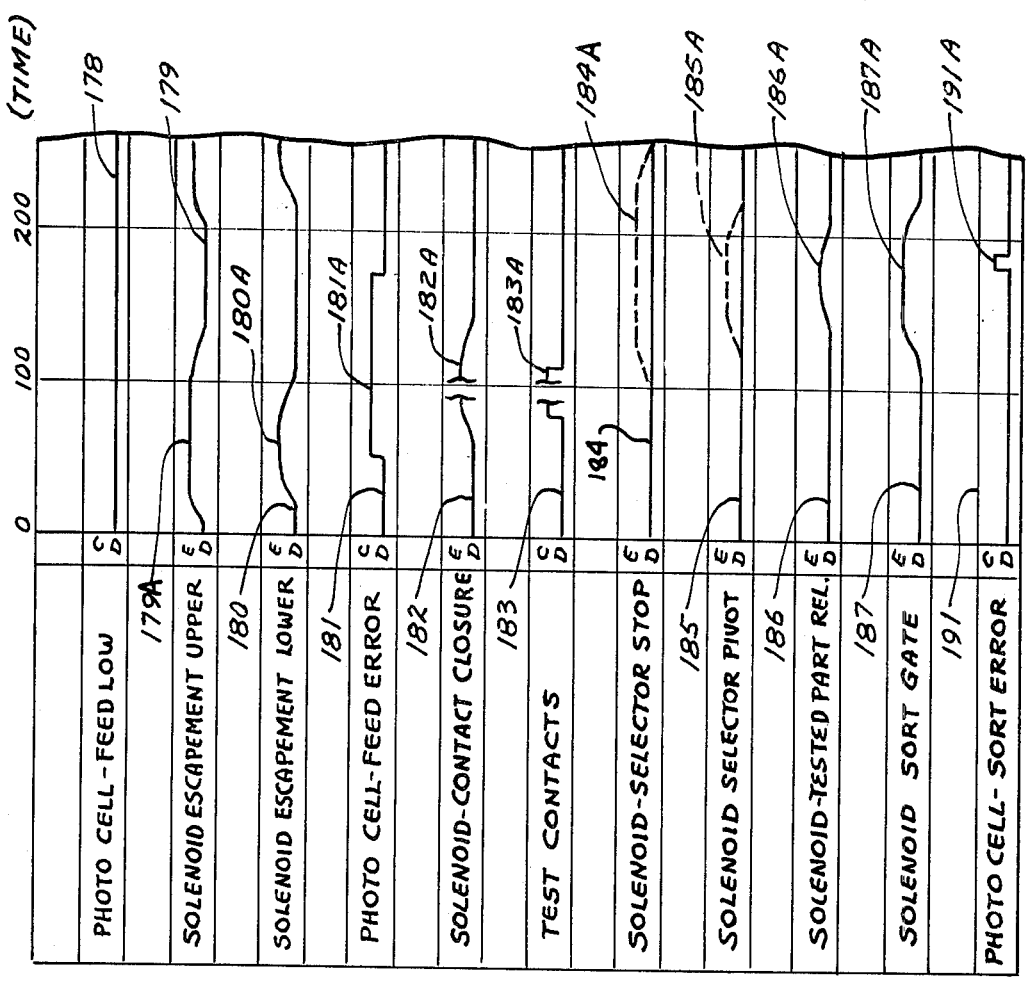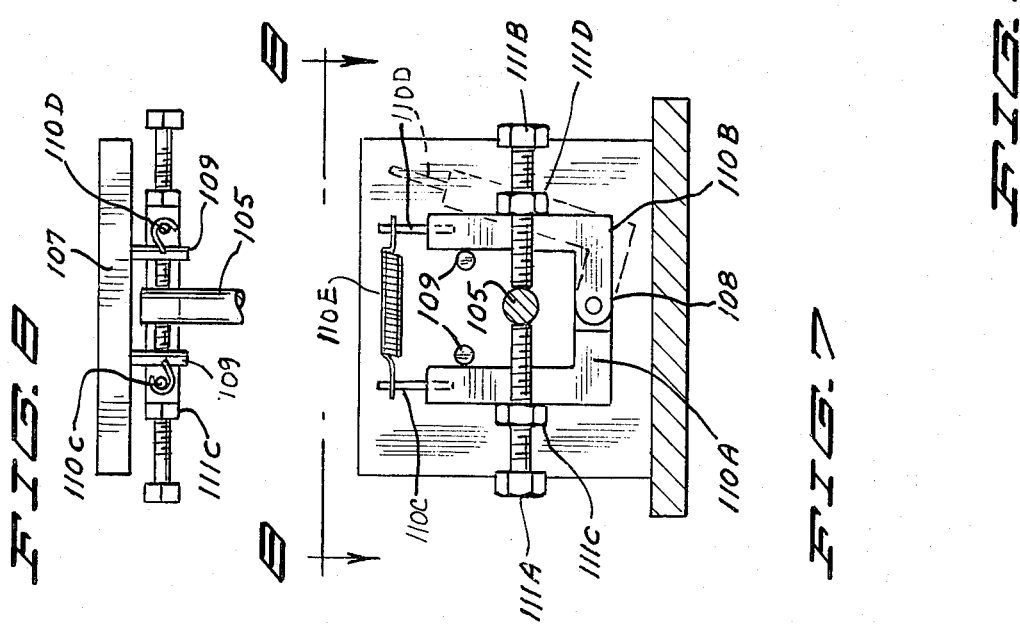

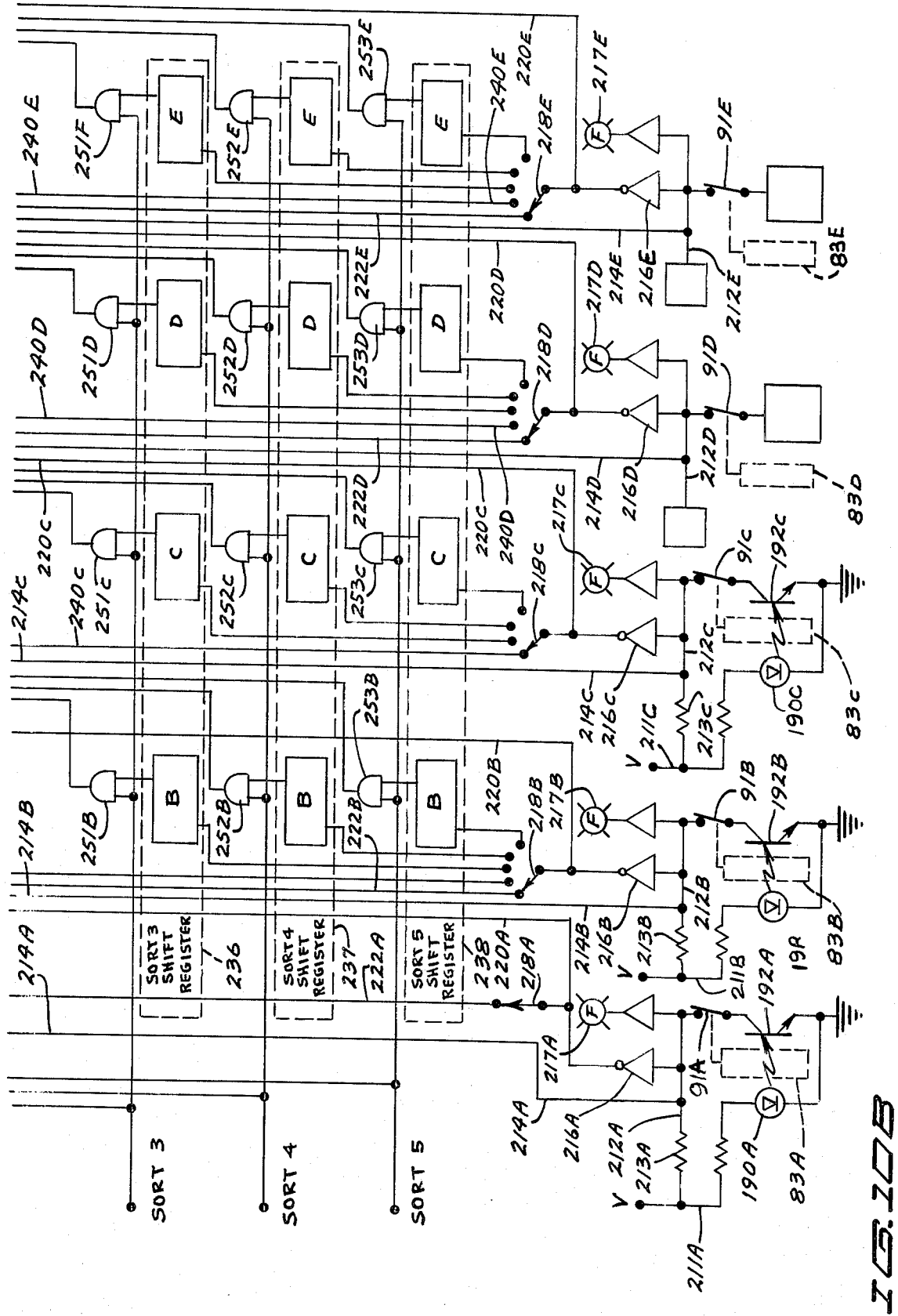

INTEGRATED CIRCUIT HANDLER

BACKGROUND OF THE INVENTION

1. Field of the Invention

The present invention relates to mechanical integrated circuits handlers for handling circuit chips to be tested in a high speed testing and sorting operation.

2. Description of the Prior Art

In the prior art, a wide variety of different types of handlers have been utilized which will handle miniature electronic components and provide sorting functions in response to separate test signals. The advent of integrated circuits has made it necessary and desirable to have some type of a handler for automatically positioning the integrated circuits in a rapid manner for testing purposes.

Integrated circuits may include many types of electronic components on a single chip, and while the sizes are somewhat standard, generally the lengths of the chips vary. Each manufacturer of integrated circuits provides his own test, because the tests to be performed on the circuits before they are sold can be varied. The handlers presently marketed are limited as to the number of catagories of sort and also are limited as to reliability.

SUMMARY OF THE INVENTION

The present invention relates to a handler for integrated circuit chips. The handler provides means for orienting the circuit chips into position wherein the leads provided on the circuit chip can be electrically connected to an interface contact assembly which, in turn, is connected to the desired external testing circuitry for running tests that the manufacturer or user of integrated circuits wants to perform on the circuits. The handler includes means for sorting the individual circuits into particular stacks or storage magazines in accordance with signals from the external test circuitry.

The handler of the present invention includes electromechanical devices for permitting the handling of circuit chips of different lengths, and it precisely positions the chips wherein contact can be made with the leads on the chips with positive movement controlled by solenoids.

The handler is made of modular units for operation, so that if the units malfunction they can be replaced readily. In addition, certain interlock photocells are used for determining that a chip is properly positioned, before the test is run, and to determine that the chip has been properly sorted after the test has been run.

The present device also provides means for supporting the chip in its test position by the leads or contact arms of the chip rather than the body of the chip so that the positioning of at least one pair of leads of the chip is precise, and the rest of the leads then will be properly positioned so that the contacts that are contacted to leads of the chip for testing will be in the proper location.

BRIEF DESCRIPTION OF THE DRAWINGS

FIG. 1A is a side view of a typical chip having an integrated circuit thereon;

FIG. 1B is a cross section view of a typical chip storage tube showing a chip in position therein;

FIG. 7 is a sectional view taken as on line 7—7 in FIG. 2;

FIG. 8 is a view taken as on line 8—8 in FIG. 7;

FIG. 9 is a graphic display of the time sequence of operation of the handler; and FIGS. 10A and 10B together comprise a schematic diagram of the circuitry for handling and sorting chips in relation to the signals received.

DESCRIPTION OF THE PREFERRED EMBODIMENT

Figure 1:
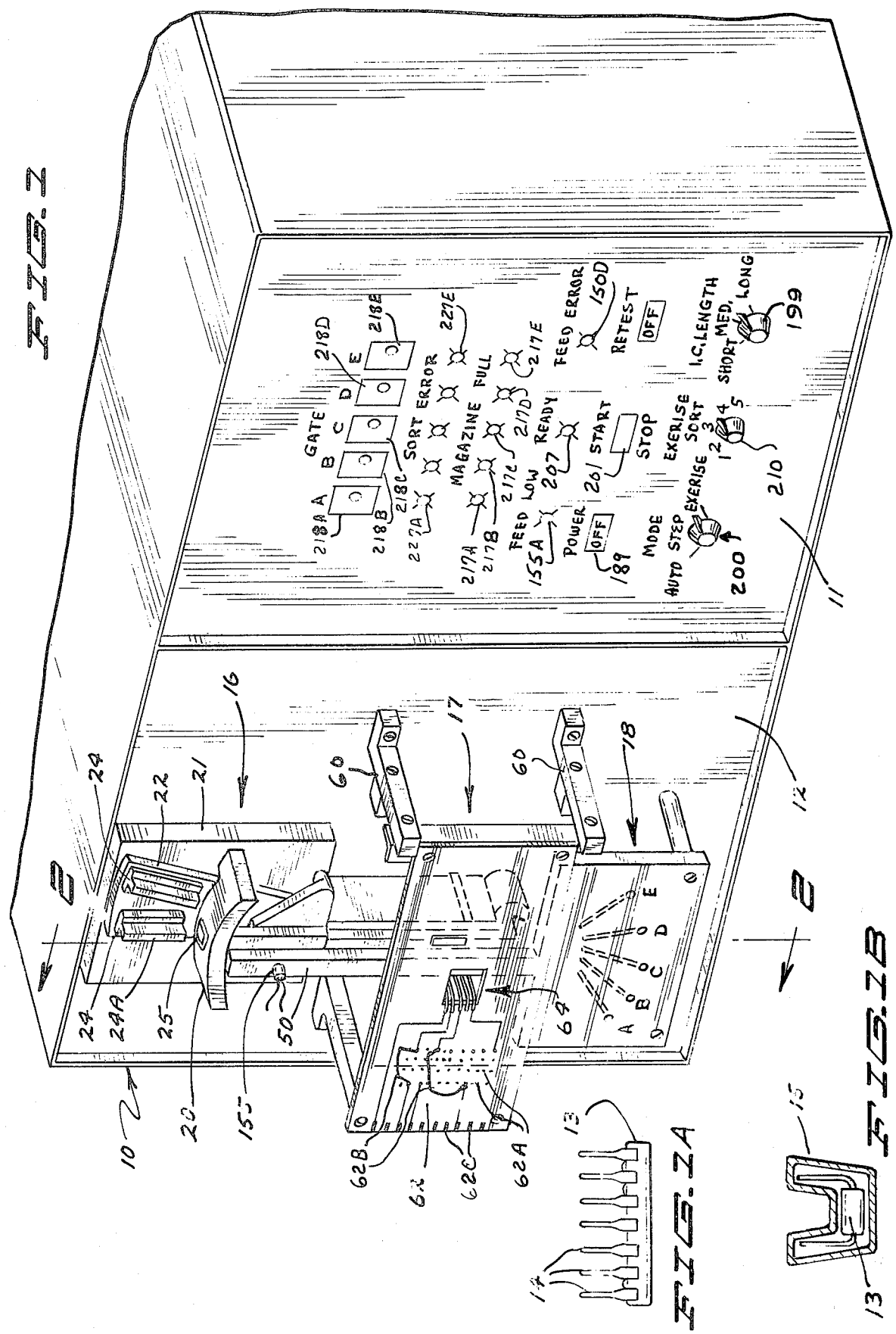
FIG. 1 is a fragmentary perspective view of an integrated circuit handler made according to the present invention.

In FIG. 1, the sorter of handler 10 made according to the present invention is shown in perspective overall view. The unit is divided into a control section 11, which includes the various controls and a handler section 12 which includes the means for positioning the integrated circuit chips for testing, and for sorting the chips after the tests have been performed.

Integrated circuit chips are quite well known in the art, and FIGS. 1A and 1B show a typical chip at 13. The chip includes a body member, and a plurality of conductive leads 14 which extend from opposite sides of the chip body and form the electrical leads to the circuit components on the chip body. In FIG. 1B, a chip storage tube or magazine 15 made of a suitable plastic and of desired length, is shown with a chip 13 in place for sake of clarity of illustration. The magazines 15 are quite conventionally used for storing chips stacked in end to end relationship. These magazines are removably mounted on the handler to position the chips for handling.

In addition, the handler includes a feed section 16, a testing section illustrated generally at 17, and a sorting section illustrated generally at 18 as the lower end. It will be noted that the feed section is above the testing section, and the sorting section is below the testing section so that gravity is used for moving the chips from the untested storage portion, through the test section, where the chips are retained while being tested, and then down to the various storage magazines as desired. As shown, there are five sort catagories listed as A through E on FIG. 1 and a storage magazine 15 is supported to receive tested chips in each catagory.

In the feed section 16 as can be seen, there is an arcuate support plate 20 (see also FIGS. 2 and 4) supported on a block 21 that is mounted on front wall 61 of the cabinet or frame for the handler. Support plate 20 is fixed in position with respect to the frame. A chip storage magazine mounting plate 22 is pivotally mounted about an axis indicated at 23 to a suitable pin, and the mounting plate 22 has a support block member 24 that includes a center guide 24A that fits into the center recess of the magazine 15. Also clips 24B may be used so that the magazine or tubes will be held on this block. The plate 22 extends through a provided slot at the rear of arcuate plate 20. As shown, there are two of these blocks 24 for mounting the magazines 15, one adjacent each edge of the plate 22. When a magazine 15 full of chips to be tested is positioned onto one of the blocks 24, the block can be moved by pivoting mounting plate 22 to its position shown in solid lines in FIG. 4 so that the magazine full of chips is directly above an opening 25 in the arcuate plate 20 through which the integrated circuit chips can drop. A guide rib 31 is positioned directly below the opening 25 and actually extends partially into the opening 25 so that when the movable plate 22 is positioned the magazine 15 is properly aligned with the rib and the integrated circuit chips will drop downwardly along the rib 31 under force of gravity. A slot 26 in plate 22 is provided to permit the rib 31 to be fastened to the plate 21. A stack of chips coming from the supported magazine will be stopped by a lower escapement stop rod 40 that normally protrudes out to intercept and hold chips sliding down rib 31. When rod 40 is retracted, chips can drop to testing position. There are also three stack retaining rods 34, 35 and 36 which are selectively used and each is used for different lengths of chips and holds the second chip up in the stack.

Figure 2:
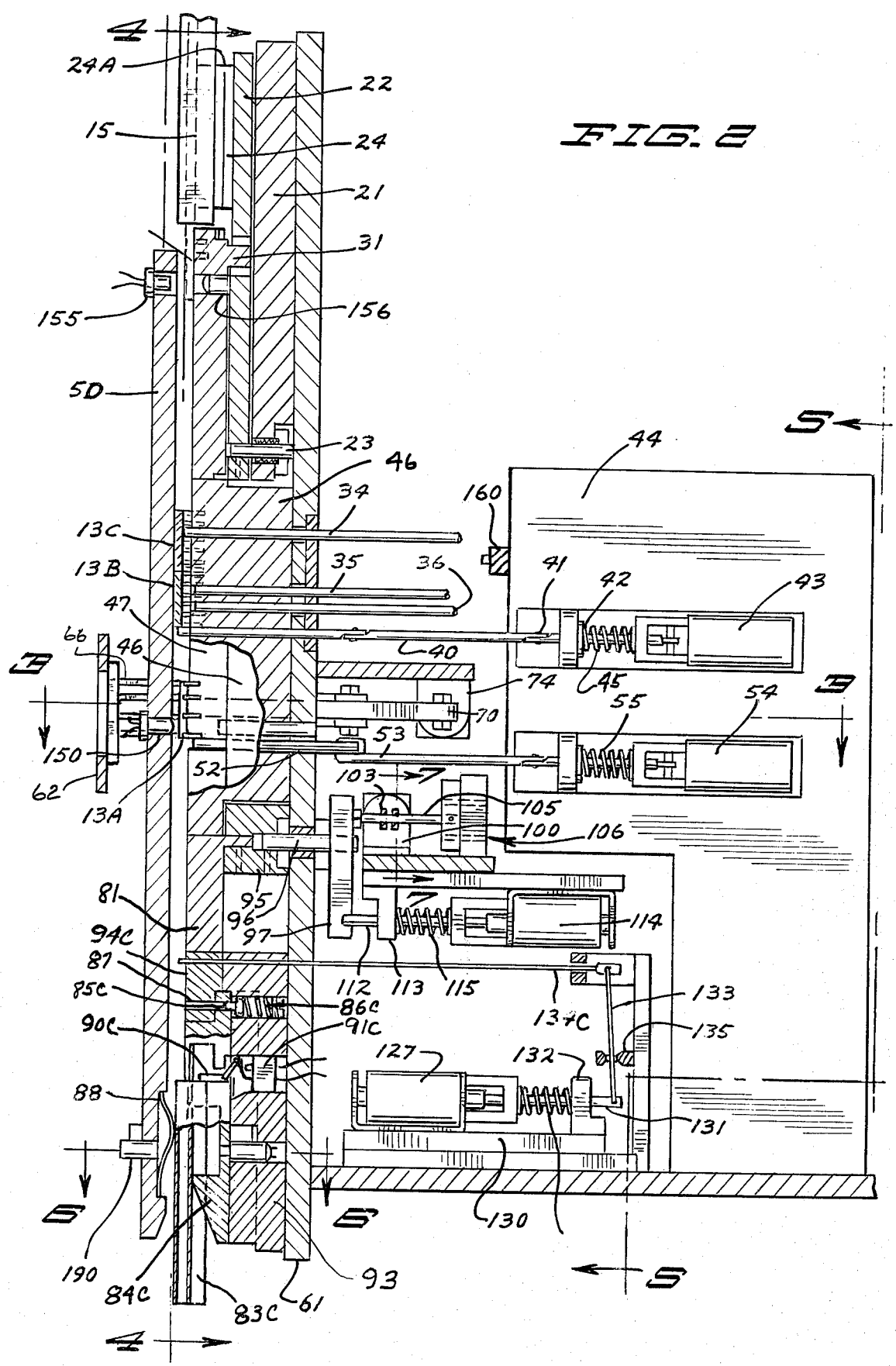
FIG. 2 is a vertical sectional view taken as in line 2—2 in FIG. 1 with parts in section and parts broken away.
Figure 4:
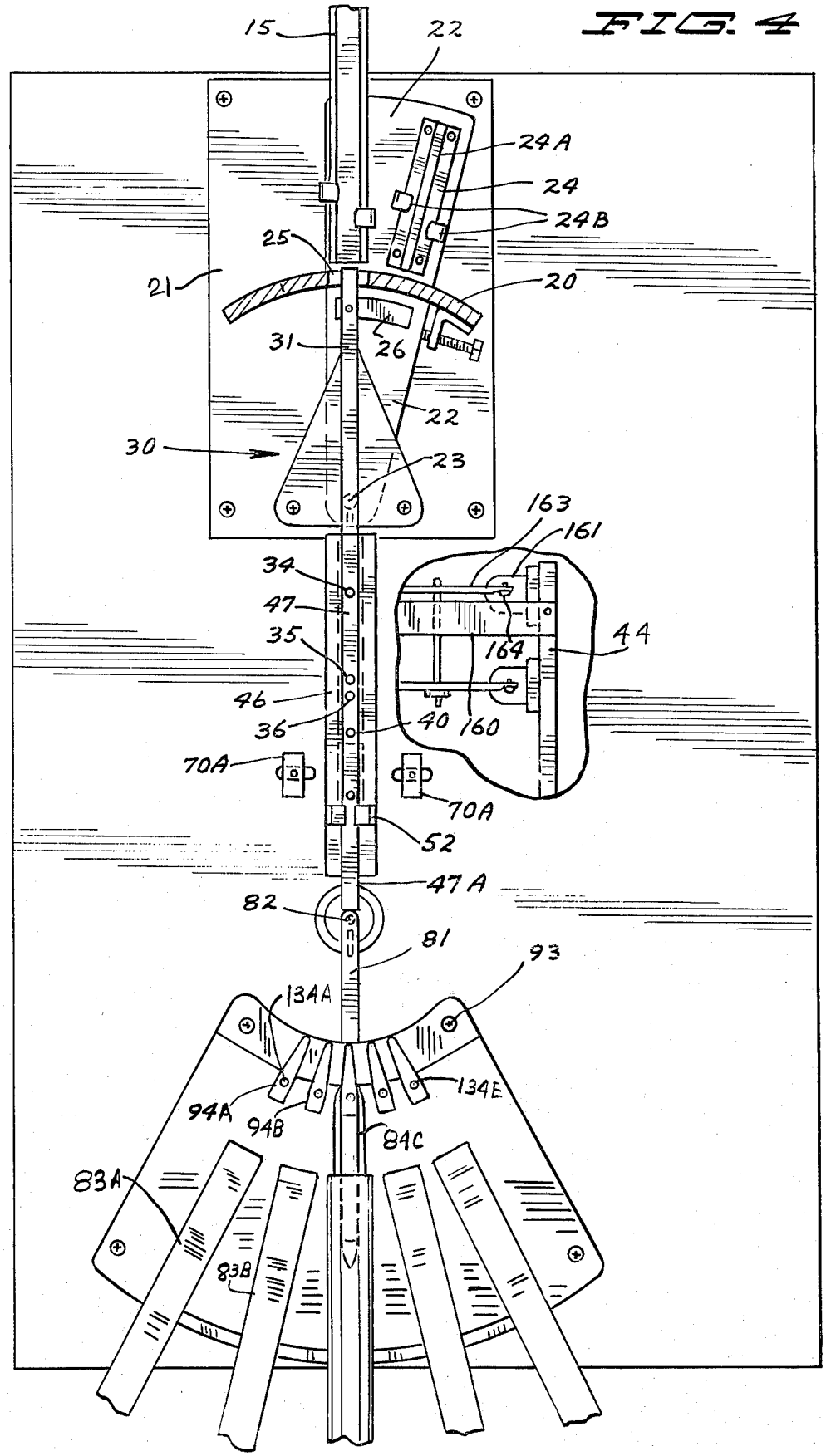
FIG. 4 is a sectional view taken as in line 4—4 in FIG. 2.

Stack retaining stop rod 34 (also called the upper escapement), is slidably mounted in the frame, and can be seen in FIGS. 2 and 4. This stop rod 34 is the upper one of the rods shown in FIG. 2 and is used during the test sequence for long chips to hold the stack of chips from downward movement when the lower chip in the stack is dropped into the test area. When operated and as shown in FIG. 2, the rod 34 will push the chip 13C (second from the bottom of the stack) against a front plate 50 mounted on the frame adjacent the stack to trap this chip and keep it and the rest of the stack from dropping.

A stop rod 35 may be used for retaining the stack for medium length chips and a stop rod 36 is for use with short chips. The rods 35 and 36 would be alternates to rod 34. Only one of the rods 34, 35 or 36 is used for any particular size of chip being tested.

The rods 34, 35 or 36 provide an upper escapement stop for holding the column of chips to be tested when the lower escapement rod 40 permits the lowermost chip to be dropped into the test area or test station.

The rod 40 is shown in normal position, and is connected as at 41 to the actuator 42 of a solenoid 43 that is mounted in a suitable support 44 in the frame. This can be seen in FIG. 2, and the end of rod 40 also is seen in FIG. 4. The solenoid actuator 42 is loaded with a spring 45 to urge the actuator and rod 40 to an extended position. When the solenoid 43 is energized to rod 40 is retracted so that any chip (or chips) not otherwise retained and which was normally held on the top of the rod 40 is permitted to drop down into the testing area or position. The rod 40 is slidably mounted in a provided opening in a support block 46 mounted on the front frame. As shown, the block 46 includes a guide rib 47, which is narrower than the main portion of the block. The rib 47 aligns with the rib 31, and is of size to pass between the pins of leads of the chips, so that the chips slide down along this rib. It also should be noted that the front plate 50 is used to keep the chips from falling away from ribs 31 and 47 as the chips are guided or slide downwardly.

Figure 3:
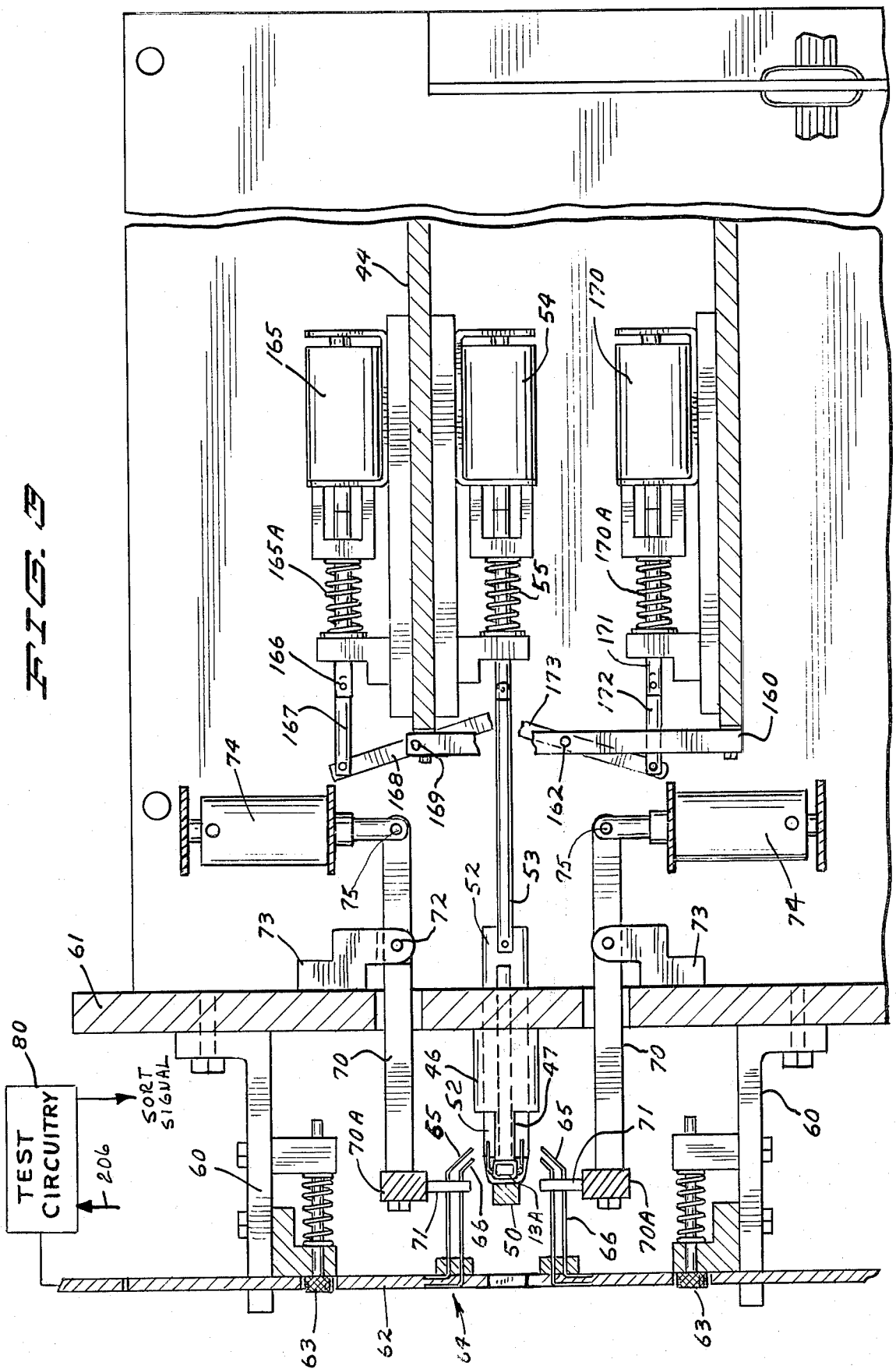
FIG. 3 is a sectional view taken as in line 3—3 in FIG. 2.
Figure 5:
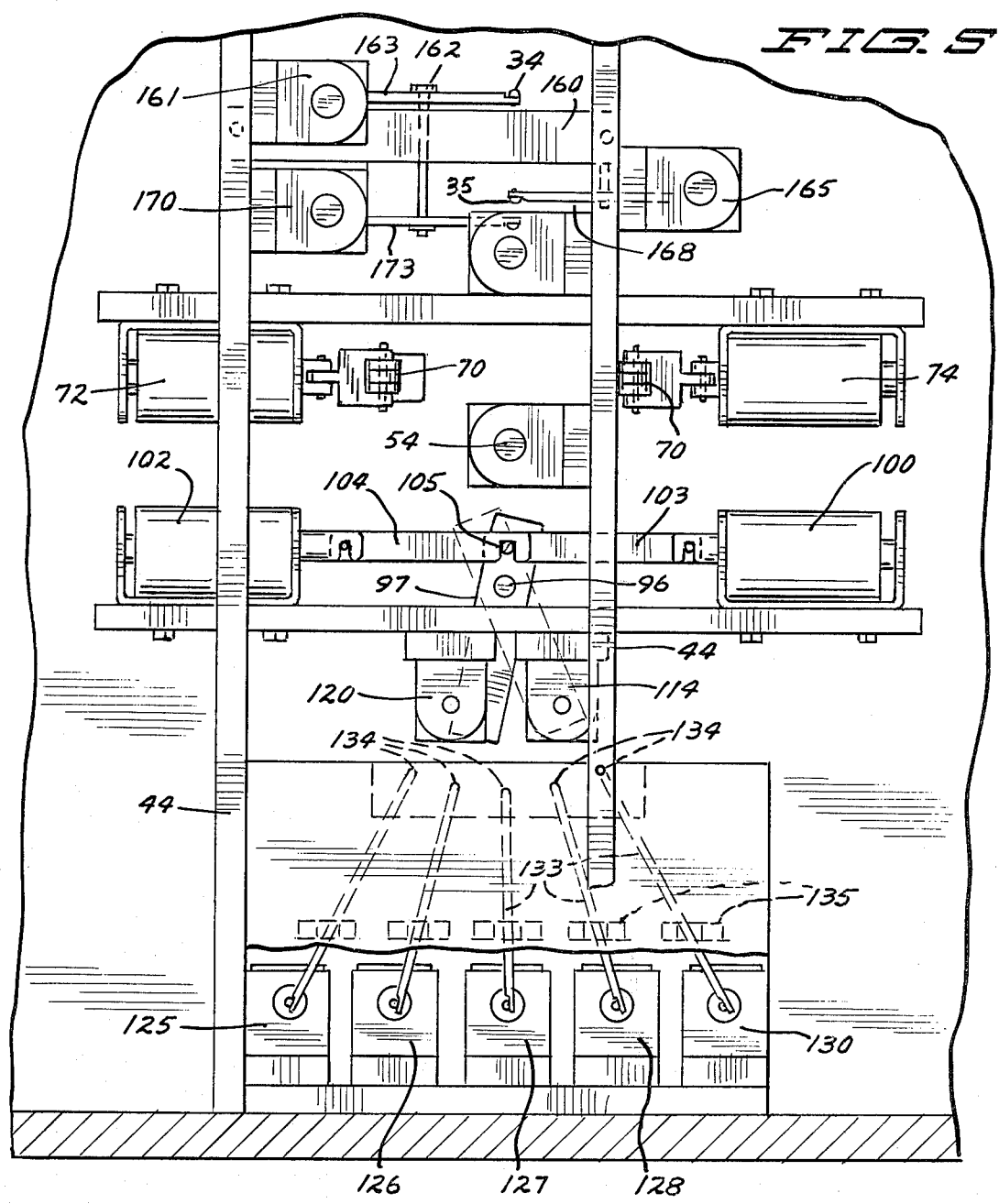
FIG. 5 is a rear elevational view of the device taken as on line 5—5 in FIG. 2.

The stack retaining or support rods 34, 35 and 36 are actuated by separate solenoids as shown in FIGS. 3, 4 and 5. The upright supports 44 have a cross member 160 extending therebetween and fastened to the forward edges thereof in a suitable manner. This cross member 160 forms a support for a number of different pivot pins used for controlling the rods 34, 35 and 36. As shown, a solenoid 161 is mounted to the upper portion of one of the supports 44, above the cross member 160 and a pivot pin 162 pivotally mounts a lever 163 which is connected with a suitable connecting member or link 164 (see FIG. 4) that is connected to the actuator rod of the solenoid 161. The other end of lever 163 in turn is pivotally connected to the end of rod 34, as shown in FIG. 5, so that pivoting of the lever 163 about the pin 162 results in axial movement of the pin 34 between a holding position shown in FIG. 2 and a retracted position. This solenoid 161 is constructed in the same manner as the other solenoids described, such as solenoid 54, and the actuator is spring loaded so that the pin 34 is normally retracted. This means that the spring load on the solenoid normally extends the actuator rod for the solenoid 161. When the solenoid 161 is energized, the solenoid actuator rod is retracted, pivoting the lever 163 and pushing the retaining rod 34 forwardly to its position wherein the second chip from the bottom 13B, positioned in front of the rod is pushed against the member 50 and held in place to support the stack of chips.

The retaining rod 35 which is operative when testing intermediate length chips is operated in much the same way by a solenoid 165 mounted onto the support 44. The solenoid 165 has an actuator 166 (see FIG. 3) that is connected to a link 167 which in turn is connected to lever 168. Lever 168 is pivotally mounted on a pivot pin 169 to the cross member 160. A spring 165A is mounted to urge actuator 166 outwardly to the solid line position when solenoid 165 is relaxed. The outer end of the lever 168 is pivotally connected to the end of the rod 35 in a suitable manner, so that the rod 35 will be extended when the solenoid 165 is energized and retracted when the solenoid 165 is deenergized. The rod 35 is used for the upper escapement for intermediate sized chips, so that it will engage a second from the bottom chip, or in other words, the second chip from the lower escapement rod 40, if the chips are not long enough for the rod 34 to be used.

The stack retaining rod 36 is controlled by a solenoid 170 which is also mounted to upright support 44, and having a spring 170A which holds the actuator 171 in a normal extended position. When the solenoid 170 is energized the actuator rod 171 is retracted. A connector link 172 is connected to actuator 171 and also is pivotally attached to a lever 173 that is pivotally mounted on the same pin 162 as the lever 163. The opposite end of lever 173 is pivotally mounted to the rod 36, and this rod 36 is then controlled by the solenoid 170. When the solenoid 170 is energized the rod 36 engages a second chip in the stack from the chip supported on the lower escapement rod 40.

As stated previously, the pivoting levers are used so that in the normal position, using a standard solenoid, the rods for the upper escapement are normally retracted, and upon selective energization of the proper solenoid the associated rod will be pushed outwardly to engage any chips in place and hold the second from the bottom chip in the stack while the lowermost chip is dropped into a testing position upon actuation of the solenoid 43 and retraction of rod 40.

Assuming that the stack has been held and the rod 40 retracted a chip will drop down into the test area. Each chip is held in the testing position by a slide member 52 that is slidably mounted in the block 46, and extends to the interior of the tester. Movement of the slide is controlled by a control rod 53 that is connected to the actuator rod of a solenoid 54. The actuator of solenoid 54 is spring loaded with a spring 55 so that the slide member 52 is normally positioned as shown in FIG. 2 to engage the leads or pins of any of the chips 13 sliding down along the rib 47 and to support the leads and the chip in position to be tested. The slide member 52 is bifurcated and one leg passes along each of the opposite sides of the rib. The block 46 has openings through which the legs of slide 52 extend. When the solenoid 54 is deenergized, the spring 55 urges the slide 52 to the position shown in FIG. 4, and any chip 13 that drops down from the lower escapement mechanism comprising the rod 40 will be stopped in position for testing.

A chip 13A is positioned is shown in FIG. 2 on the top of the slide 52, and it will be noted that the legs of the slide only engage the bottom most contacts or pins of this chip 13A to support it properly for making the connections necessary for testing.

As shown in FIGS. 1 and 3, suitable supports 60 are provided on opposite sides of the test area 17 and extend outwardly from the front wall 61 of the cabinet. A test circuit interface board 62 is mounted on supports 60. The board 62 has a number of circuit paths defined thereon and also includes a number of contact sets arranged vertically in opposed pairs and the pairs correspond in number to the number of pins or leads on the chip to be tested. For example, if there are seven pairs of pins on the chip to be tested, there would be a vertical arrangement of seven of the pairs of contact sets as shown in FIG. 3 extending upwardly.

The interface board 62 is held in place with suitable screws 63, and includes connections which can be connected to the test circuitry. The test circuitry can be of any desired circuitry, for example, merely a continuity checker to determine whether or not the circuits are continuous between selected pins on the chip, or the test circuit could include means for measuring the gain of an amplifier on the chip. Othe tests may be used to make sure that the circuit components on the chip are operating properly, such as checking resistance, or any other desired tests that wish to be performed. The test circuitry itself forms no part of the invention, and each test circuit is specifically designed by the manufacturer or user of the chips to be tested so that their chips are tested in accordance with their own specifications. One pair of contact sets is illustrated generally at 64. Each of the sets of contacts includes two contact wires for each lead or pin of the chip. The set of contacts are in horizontally aligned pairs and are of size and in a position so that they will engage the opposite, aligned pins on the chip 13A held in the test station as shown in FIG. 3. Each set of contacts thus comprises double contact wires, comprising an outer contact wire 65, and an inner contact wire 66. The sets of contacts are made double so that it is assured that at least one of the contact wires 65 or 66 will engage a pin on the chip and form a good ohmic contact for electrical signals to and from the chip as desired. The ends of the contact wires 65 and 66 are anchored to the interface board and connected to circuit paths as shown in FIG. 1. The contact wires 65 and 66 of each set and each of the sets of contacts on the opposite sides of the test station are mounted in an insulating block 71. Thus the sets of contacts on each side of the chip may be moved as a unit.

A pair of actuating arms 70, on opposite sides of the center block 46 which supports the chip, are pivotally mounted at respective spaced pivots 72, to supports 73 that, in turn, are mounted to the wall 61. The arms 70 are each controlled by a separate solenoid 74 that is linear acting, and the arms are connected to the actuating members of the solenoids at pivot connections 75. The solenoids are shown in their relaxed position and are spring loaded to normally urge the contact wires 65 and 66 to spring away from the center support area in the test station, but when the solenoids 74 are energized, as will be more fully explained, the solenoids will pivot the arms 70 so that end blocks 70A bear against the insulation blocks 71 and the contact wires 65 and 66 carried thereby move toward the chip 13A, which is supported on the slide member 52. These contact wires are springy, electrically conductive material, and they move so that they come into contact with the pins on the chip with which they are aligned to make the actual electrical contacts to the chip held on the slide 52. The interface board as shown has circuit paths leading to contacts at the edge of the board. Also, the board has receptacles shown at 62A for receiving plugs of a patch cord 62B so that the connections between the contact wires 65 and 66 and the edge contacts 62C on the board may be charged.

Once the chip 13A has been tested, and the testing is completed, the test circuitry indicated generally at 80 will supply a signal to the sorter, so that it will indicate that the test is completed. As will be more fully explained the signal from the test circuit will cause energization of the solenoid 54, to retract the slide 52 to position so that the chip which was just tested will be released, and the chip then will fall under gravity down into the sorting section of the handler.

A connector clip may be used over the edge of interface board 62 for making connection to the test circuitry.

As can be seen in FIG. 4, when the slide 52 is retracted, the chip will slide down along the lower portion of the block 46, and as can be seen, the lower end of the rib 47 indicated at 47A extends downwardly to just above a sorting finger 81 which is pivotally mounted about an axis 82, and is controlled about this axis through a solenoid action in response to signals indicating which one of a plurality of storage tubes or magazines indicated at 83A, 83B, 83C, 83D and 83E should be used.

These storage magazines are held in place in any desired manner, for example, with a small leaf spring 88 that holds the respective magazines against a mounting rib of a magazine adapter plate 84.

Figure 6:
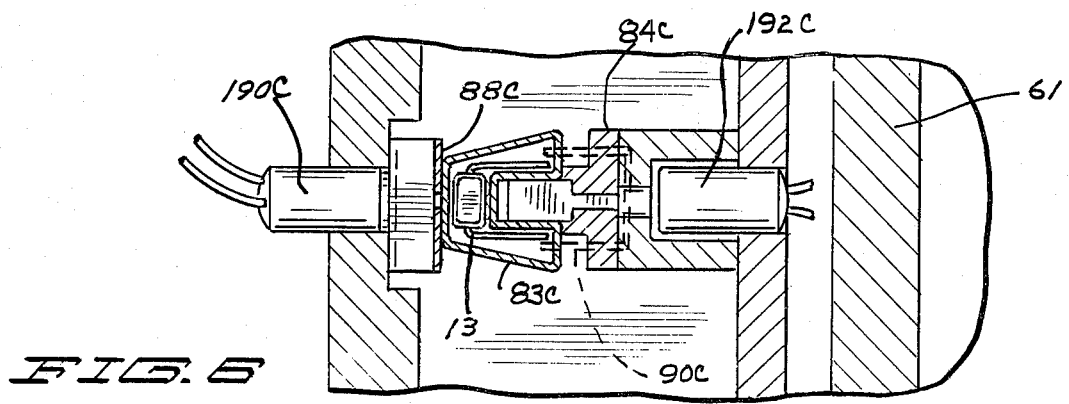
FIG. 6 is a sectional view taken as in line 6—6 in FIG. 2

When one of the storage magazines 83 is mounted in place, for example the magazine 83C as shown in FIGS. 2 and 6, (the mounting is identical for each of the sort categories A through E) the upper end of the magazine will engage a separate pivot lever 90 that is pivotally mounted to the magazine adapter 84 for each magazine. The pivot levers 90 are bifurcated so that the legs of the levers will clear the path of travel of the chips to be sorted. The levers 90 will engage the actuators of microswitches 91, which form an interlock when the tube or magazine for a particular category is in place.

Any suitable type of arrangement can be used which provides an indication or interlock switch that engages the upper end of each of the storage magazines when the magazine is in proper position so that the switch will be closed. As shown in FIGS. 2 and 6, the parts are numbered using the C suffix to indicate that they are the with the C sort category. Also note that in FIG. 6 a dotted line representation of the switch lever shows how the lever contacts the magazine 83C without interfering with the path of travel of a chip to be sorted.

The magazine adapters 84A–E may be changed to accomodate particular magazines that are in use with the sorter. It should be noted that different size chips require different size magazines, and the center recess of the magazine, the width of the legs, or the length of the legs might be slightly different and if so, a different adapter can readily be used. By using adapters that include center guide members which, when in place, align with stationary sort guide fingers 94, respectively, (See FIG. 4) a wide variety of chips and magazines can be utilized. In FIG. 4 only adapter 81C is shown for sake of simplicity. The other adapters are identical.

As can be seen, in FIG. 2, the guide 83C is removably held in place by use of a small latch pin 85C that is loaded with a spring 86C, and which is mounted in the main mounting block 93 that is fixed to the front wall 61. The end of pin 85C protrudes into a through opening 81C provided at the upper end of the mounting adapter 84C, and by pushing a small sharp tool through the provided opening 87 in each of the guide fingers 94, the respective plunger or pin 85 can be moved to clear the adapter and the adapter pulled downwardly to clear the lower surface of the guide finger 94. The adapter may be removed from the unit to be replaced by other types as desired.

The main mounting block 93 is mounted onto the front wall 61 of the cabinet, and causes the five guide fingers 94, which are positioned above the storage magazine. The fingers 94 are positioned an angle so that their central axis passes through the pivot axis 82 of the pivot finger 81 and align with the axes of the respective storage magazine as well.

The pivot finger 81 is mounted onto a collar 95, as can be seen in FIG. 2 by a small lug at the rear of the finger 81. Collar 95, in turn, is mounted to a shaft 96 that passes through a bushing in the front wall 61 of the machine, and the finger 81, collar 95, and shaft 96 are thus rotatably mounted as a unit with respect to the front wall 61. The shaft 96 also has an actuator arm 97 mounted thereon on the inside of the sorter machine as can be seen in FIG. 2 as well. The actuator arm 97 is drivably mounted onto the shaft 96, and thus rotates with the shaft. The position of the shaft 96 and the actuator arm 97 is controlled by a pair of oppositely disposed solenoids 100 and 102 which have actuators that are connected through links 103 and 104, respectively, to a shaft 105 that is drivably mounted on the arm 97 and extends rearwardly therefrom, as can be seen in FIGS. 2 and 5. The shaft 105 is also controlled by a suitable spring return mechanism indicated at 106 which tends to center the shaft 105, and thus sorting finger 81, whenever neither of the solenoids 100 and 102 is energized. The finger 81 is thus normally returned to its solid line position shown in FIG. 4, and the shaft 105 and thus finger 81 can be shifted from one side to the other by energization of one of the solenoids 100 and 102, depending on the signals received from the test circuitry.

The amount of shifting of the actuator arm 97 laterally when one of the solenoids 100 and 102 is energized is also controlled by stop pins on opposite sides of the arm 97. For example, there is a stop pin 112 that is slidably mounted in a bracket 113, and controlled by a solenoid 113 so that when the solenoid 114 is released, a spring 115 moves the pin 112 to a position wherein it will interfere with the pivotal movement of the actuator arm 97 and prevent the actuator arm 97 from pivoting more than a selected amount from its centered position. The stop pin 112 will normally stop the actuator arm 97 when the solenoid 102 is energized, unless the solenoid 114 is also energized.

Likewise, another solenoid 120 carries a similar stop pin symmetrically located with the pin 112 that is slidably mounted and will prevent the actuator arm 97 from rotating about the axis of the pin 96 more than a selected amount when the solenoid 100 is energized. The pin for solenoid 120 is aligned with the center of the solenoid 120 and stops the arm 97 in the solid line position thereof in FIG. 5.

When the solenoid 114 is energized for example, and the solenoid 102 is energized, the actuator arm 97 will rotate all the way to its position shown in dotted lines in FIG. 5, so that the lower end of arm 97 will move past the stop pin.

However, for example, if the solenoid 120 is not energized, and solenoid 100 is energized, the actuator arm 97 will only move to its solid line position shown in FIG. 5. The solenoid control and spring return provide a centered position; (no solenoids energized) two intermediate positions; (solenoids 114 and 120 not energized and either solenoids 100 or 102 energized); and two extreme positions to either side (either solenoids 100 and 120 energized or solenoids 102 and 114 energized) to give the five positions of the sort finger 81 for selection of the proper storage magazines into which the tested integrated circuit chips are to be placed.

The spring return 106 for the shaft 105 is shown in detail in FIGS. 7 and 8. The spring return can be any desired kind, but in the present device, an upright support 107 mounts a pivot pin 108, and a pair of stop pins 109. The pivot pin 108 has a pair of L shaped actuators 110A and 110B, respectively, mounted thereon with the upright legs of the actuators spaced apart. Suitable adjusting screws 111A and 111B, respectively, are threadably mounted on the actuators, and the screws 111A and 111B can be adjusted inwardly and outwardly. The shaft 105 is positioned between the ends of these adjusting screws 111A and 111B, and is engaged by both of the adjusting screws. The upright legs 110A and 110B have pins 110C and 110D at the upper ends thereof, and a spring 110E extends between these pins to spring load the actuators toward each other about the pivot pin 108. These arms then engage the stop pins 109 which extend from the support 107. This is in the rest position. The adjusting screws 111A and 111B can be threadably mounted in the nuts 111C and 111D, respectively, which are attached to the upright portions of the actuators 110A and 110B until they touch the shaft 105 in the shaft's normal centered position, while the actuators are engaging the stop pins 109. The shaft 105 is moved by action of the solenoids 100 and 102, in one of two opposite directions (only one solenoid is energized at a time) and the shaft 105 will then move sideways, in accordance with the selected operation of the unit. The shaft 105 will be urged back toward its center position as shown in FIG. 7, by spring 110E and once the solenoid that caused movement of the shaft is deenergized or relaxed, the shaft will be centered. The shaft 105, and attached arm 97, and consequently the sorting finger 81 will always return to the normal centered position.

For insuring accurate sorting, there are five individual solenoids that control sort gate stop rods to prevent chips from moving into a different storage magazine from the proper magazine selected in response to the sort signal signals. These sort gate solenoids are shown at 125, 126, 127, 128 and 129 in FIG. 5, and the solenoid 127 and the associated connections to its stop rod are shown typically in FIG. 2. As shown, the solenoid 127 is mounted on a suitable support 130, and has an actuator 131 that is slidably mounted on a support 132, and has a spring 131A urging the actuator outwardly. The actuator 131 in turn, is pivotally mounted to one end of a pivoting rod 133 that is slidably mounted through a suitable pivot bracket 135 and which is pivotally connected to a sort gate stop rod 134C at the other end thereof. The pivoting rod 133 pivots on pivot bracket 135 which is mounted on an upright support. Each of the solenoids controls a separate pivot rod 135 which in turn operates a separate stop rod 134A-134E. The stop rods 134A-134E are slidably mounted through the front wall 61 of the sorter, and are slidably supported in the support block 93 and the corresponding guide finger 94. Each stop rod is operated alike, and when the respective solenoids are relaxed, the rods protrude into the path of any chip being sorted and moving along the respective finger 94, as shown in relation to finger 94C in FIG. 2. When the respective solenoid is energized, the stop rods retract and permit a chip to slide down past the end of the selector finger 81, and across the associated guide finger 94. The rods are to prevent feeding of the chips into a storage magazine unless the proper solenoid is energized. These small rods 134A-134E thus are safety (or fail-safe) feed controls that must be energized (receive a signal) before a chip will be sorted into the associated magazine.

The circuitry includes various photocell sensors to indicate that the chips are in proper place. For example, a photocell 150 and sensor or receptor (light sensitive solid state device) 151 are used to indicate when a chip is properly positioned in the test position on the slide 52. In addition, there is a "feed low" photocell 155 and sensor 156 which provide a light signal indicating when the supply of chips to be tested drops below a desired level, and suitable photocells 190A-190E and receivers 192A-192E can be used for determining when the storage magazines are full as will be further explained.

Referring specifically to FIG. 9, a timing diagram for the various sorting functions is shown.

The feed low photo sensor is normally interrupted, and this is indicated by the line 178 in FIG. 9. This indicates that there are chips in place, and if a chip is not in place, the signal would change to energize a warning light.

Line 179 shows a deenergized position of the upper escapement solenoid, and in this instance the solenoid for rod 34 is shown. The line 179A shows when an upper escapement solenoid is energized, and it can be seen it is energized early in the cycle. Only one of the respective solenoids for rods 34, 35 and 36 would be energized at a time.

The solenoid 43 for the lower escapement shows deenergization along the line 180 and energized along line 180A. It can be seen that this is then energized slightly after the upper escapement solenoid for the rod 34.

The photocell for indicating feed error is normally open, and when the chip has dropped into place on the slide 52, it would close. It can be seen that this occurs subsequent to the time that the lower escapement solenoid is energized. In other words the pulse 181A commences when the chip drops into place, and it can be seen that it commences sometime after the raised portion 180A of the line 180.

Subsequent to the indication from the feed error photocell that a chip is in place as indicated by the pulse 181A, the contact closure solenoids will be energized. The deenergized time is shown by line 182, and the energization is indicated by line 182A. This occurs subsequent to the time the feed error solenoid is closed by detecting the presence of a chip in place to be tested. Then, the test contacts signal indicated by line 183 will be closed at the same time the contact closures are made. As can be seen, the time of line portion 183A and 182A is substantially simultaneous, and these line portions are broken to indicate that the time of test can vary as desired to complete the test by the circuitry 80.

After the testing has taken place, (the time can be as long as necessary to complete th test), then a sort signal will be delivered by the testing circuitry to the sorting circuitry. The sorting circuitry will energize suitable solenoids to release the chip and to pivot the finger 81 to the proper position, and this may include either of the selector stop solenoids 114 or 120. The deenergized position is indicated by dotted lines at 184A subsequent to the completion of the test or the receiving of the sort signal. The dotted line representation indicates that this is an optional occurrence, and will depend entirely on the sort signal that occurs, but it can be seen that if the selector stop solenoid is energized it will come subsequent to completion of the test. The sort signal will determine if a stop solenoid 114 or 120 is or is not energized and the time of such energization is shown by dotted line 184A.

Once the selector stop solenoid is properly selected, either by energizing solenoid 120, or 114, or by not energizing either solenoid, then the proper solenoid 100 or 102 (if either) is energized depending on which sort signal is received. Line 185 shows the low signal to these solenoids while the dotted line portion 184A shows when the solenoids would be energized. The solenoids 100 or 102 may or may not be energized depending on the sort category and this is why line portion 184A is shown in dotted lines. Also, it will be noted that the solenoids 100 or 102, when they are energized, are energized slightly later in time than solenoids 114 or 120.

After the test has been completed, and the sorting finger pivoted by the action of the solenoids 100, 102, 114 and 120 is desired, the tested part release solenoid is energized. This is solenoid 54, and as can be seen on line 186 in FIG. 9 it is not energized until at the line portion 186A, which is after sort selector solenoids (if any) have been actuated to select the proper storage receptacle for the part being tested.

Just shortly before the part is released one of the safety sort gate solenoids 125 through 130 is energized to retract the associated pin 134. This time function is shown by line 187 energized time 187A. All the sort gates except the proper one are left in place to prevent the chips from being admitted into any one of the other storage receptacles. As a chip drops into the storage tube, the photocell 190 is momentarily blocked and the sensor 192 for that storage tube delivers a pulse indicated on line 191, at 191A, which indicates that the chip being sorted passed down into the storage magazine. This pulse 191A can be used for resetting the circuitry, or for any other control function as desired.

It should be noted that solenoid 43 controlling the lower escapement rod 40 is released shortly after the photocell 150 indicates that the chip is properly positioned on its support. This means that the lower escapement rod 40 goes to its normal position as shown in FIG. 2, and subsequent to this time, after the rod 40 is in its normal position as shown by the tapered line leading from the line segment 180A in FIG. 9, the solenoid controlling rod 34, 35 or 36, will be relaxed, so that the second from the bottom chip, which was held against plate 50, will be permitted to drop down onto and rest on the end of rod 40. Then when the cycle is repeated, the rod 34 will engage the new second from the bottom chip in the stack and hold it against the plate 50 as previously explained.

The line portion 181A shows the length of time that the chip is being held by the slide 52, which is the tested part holder. The chip to be tested is held in place until after the sorting solenoids and sort gate solenoids are energized.

Now, referring specifically to FIGS. 10A and 10B, which are made so that they will be considered together, reference will be made to the sorting logic.

A voltage source is connected through power switch 189 to the mode selector switch 200. If chips are in position to be tested the light 155A will be out. The lighting of light 155A is the signal given if the supply of chips to be tested is low. If the light is off after the power switch 189 is turned on, the start switch 201 is pushed. While held down, this switch applies a voltage signal to one input of an OR gate 193. The other input of the OR gate 193 is connected to the output of a transmission gate 204. The input of the gate 204 is connected to the "run" terminal of switch 200 and the gate will pass the voltage signal when the control signal from an inverting output OR gate 229 is high (all inputs are low). In this instance, the signal from the start switch is transmitted to one input of an AND gate 193A. Assuming that there is no chip in position to be tested, the power switch will power photocell 150, and then cause sensor 150A to conduct, resulting in a low signal on the line 150C and on the input of an inverting amplifier 194. The line 150C from the collector side of sensor 150A also is connected through an amplifier to the contact closure solenoids 72 and 74 which are in parallel and shown in FIG. 10A as a single coil. A feed error light 150D may also be energized by the output of amplifier 194 and will go out when a chip is in place.

The inverting amplifier 194 then provides a high signal to AND gate 193A and the AND gate then, because of the high output from OR gate 193, delivers a high signal to set a run flip flop 203. The output of the flip flop 203 is then applied to actuate a timer 195 to provide power to the upper escapement solenoid through the selector switch 199 and a suitable amplifier. Only one solenoid coil 161 is shown in FIG. 10A which actuates the rod 34 to clamp the chip 13C in place.

The power output of time 195 is also applied through a time delay 196 and amplifier to energize the solenoid 43 to withdraw the lower escapement rod 40 a short time after the chip 13C is clamped, as shown in the timing diagram. The chip 13B, held by the lower escapement rod 40, drops down to position 13A. This blocks the photocell 150 from sensor 150A causing the signal on line 150C to go high energizing contact closure solenoids 72, 74 and closing the contacts onto the pins or leads of the chip in test position. The line connected to solenoid 74 is also connected to a time delay 197 which has an output from the line 206 carrying the ready to test signal to the test circuitry 80. The line 206 also powers and lights a ready to test light 207. At this time it is known that the start switch can be released and the rest of the operation is automatic for sorting. With the mode switch set on automatic the testing will continue until the error or problem occurs or until the chips have all been tested. The test circuitry 80 is not part of the invention, and can be any circuitry available from the desired test on the chips being used. The signal on line 206 can be used for activating the test circuitry.

When the test circuitry 80 has completed its function the circuitry delivers a sort signal, this signal will be an electrical signal, for example, a digital pulse. This signal can be delivered to any one of five input lines and thus up to five separate grades can be sorted. Even if there is only one accept category, and one reject category the sort circuitry is set up so that one of the storage magazines (the C magazine) will always be for rejects. The C magazine is the position where the sorting finger 81 does not have to pivot. All four of the rest of the tubes can then be operated to sequentially receive the other category. Also, each of the individual sort positions can be for a separate grade signal, so that there could be a total of five categories sorted.

Figure 10A:
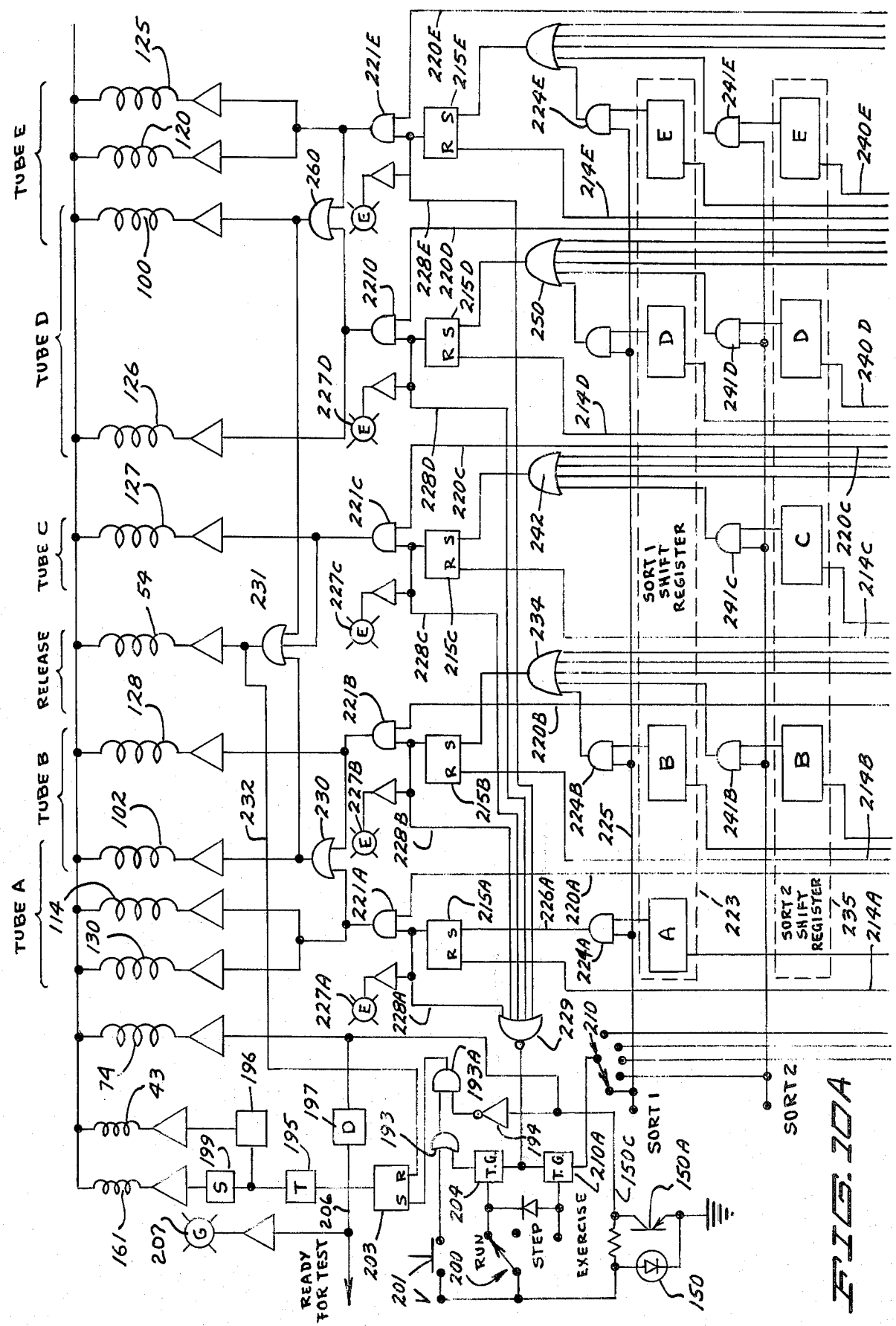

In FIGS. 10A and 10B the individual inputs for the five different sort signals are shown. These are defined as the sort 1-sort 5 signal lines. It should be noted that if the device is moved to its exercise mode by switch 200, a manual switch 210 can be provided to put a digital signal into any one of the five different sort lines to exercise the sorting circuitry as desired without having test circuitry. There is a transmission gate 210A which will provide the sort signal to switch 210 whenever a high output is received from OR gate 229. Also, a diode connects the exercise terminal to gate 204 so that operation of the circuit associated with gate 204 will be the same as on automatic. The exercise signal can be selected to provide any one of the five different sort signals. This is also shown on FIG. 1, where the exercise sort signal switch 210 is shown.

Referring specifically to FIG. 10B, it can be seen that each of the magazines 83A through 83E has identical circuitry associated with its operation, and for energizing the particular photocell 190 associated with each of the tubes. A voltage is applied along lines 211A through E. The voltage along lines 211A through E is used for energizing the photocells 190A through 190E which are tube or magazine full detectors. The switches 91A through 91E are also shown closed, and with no chip in position to interrupt the light from the photocells 190, the photocells cause the light sensitive transistors or sensors 192 to conduct. This will reduce the potential at the collector of the transistors 192, and potential of the respective connecting line 212A through 212E will be near ground. Suitable resistors 213A through 213E are used for connecting lines 212 to the lines 211, respectively. The lines 212 are also connected directly to lines 214A through 214E which in turn connect to the reset side of the selector flip flops 215A through 215E (FIG. 10A). The operation of the flip flops 215 will be more fully explained, but it should be noted that when the flip flops have been reset by signals on lines 214, they have a low output, but when they have received a pulse at their set input, they will deliver a high output signal.

Lines 212 are also connected through suitable inverting output amplifiers 216A through 216E, (the amplifier output is high when the input is low and vice versa) and through separate amplifiers to magazine full indicator lights 217A through 217E, respectively. The amplifiers are shown as triangles, and individual amplifiers will not hereafter be numbered. The outputs of the amplifiers 216A through 216E are connected to the input sides of an individual thumb wheel selector switches 218A through 218E. it should be noted that the thumb wheel switch 218A has only one connection. The thumb wheel switch 218C connects to only four output lines, while the other thumb wheel switches 218B, 218D and 218E each connect to five output lines. This is done so that the magazine 83A will only be able to receive chips that have been sorted in response to a signal on the sort 1 line and the magazine 83C will be able to receive chips that have been sorted in response to a signal on any of the signal lines other than sort 1 signal line. The magazines 83B, 83D and 83E may be set to receive chips sorted from signals on any one of the five sort signal lines.

For sake of explanation, it can be assumed that the thumb wheel switches are set so that the tubes or magazines 83A, 83B, 83D and 83F are all set to receive chips that are sorted under a sort 1 category, and that there will be no sort 3, sort 4 or sort 5 categories. The magazine 83C will be set to receive chips under the sort 2 signal only.

The outputs of each of the amplifiers 216A–E are also connected to lines 220A–E that go into one input of AND gates 221A–E. The other input of the AND gate are connected to the respective outputs of the flip flops 215A–E. Because of the inverting amplifier output of the amplifiers 216A, the signals on the lines 220A–E will normally be high, and will remain high until the light from the photocell 190A is blocked. It should be noted that when a chip drops into the magazine and passes through the photocell, there will be a momentary pulse of a low value along the line 220A through 220E.

In each of the instances where the thumb wheel switches are connected to the sort 1 category, the signals from the amplifier 216A, 216B, 216D and 216E will be carried along lines 222A, 222B, 222D or 222E, respectively. This means that when none of the magazines 83A, 83B, 83D or 83E are full, there will be a high level logical signal on lines 222A. The outputs of sections A, B, D and E of shift register 235 are connected to the inputs of AND gates 224A, 224B, 224D and 224E, respectively. The portion A of the shift register 223 and also each of the other registers will always deliver a high output to the AND gate 224A until the magazine is full, and once it is full the photocell 190 will be blocked and the signal on line 212 will raise because of the presence of a chip. This will cause the output of the inverting amplifier 216A to go low causing a low signal on a line 222A. This low signal on line 222A will then cause a shift to the B section of the shift register 223, and when the shift has occurred a high signal on the line 222B will cause a high signal at the output of the portion B of shift register 223 to the AND gate 224B.

Assuming first, however, that the magazine 83A is not full, the high level signal on line 222A will be carried to one input of the AND gate 224A through the section A of the shift register 223. Now assuming that the test circuit provides a signal for sort 1 along a line 225, which is connected to one of the inputs of each AND gate 224. The output of AND gate 224A to go high (the output of Section A of the shift register 223 is high) and this output on line 226A will set the flip flop 215A so that there will be a high output from the flip flop to the second input of the AND gate 221A. The first input of the AND gate 221A is receiving a high signal from the line 220A, and the high output of the flip flop 215A causes the output of this gate 222A to go high and a number of things to happen. First, the output signal from 215A lights up a sort error light 227A through a suitable amplifier, and also places a high input along a line 228A to one input of an AND gate 229. The high output of the AND gate 221A is connected in parallel through suitable amplifiers to energize the solenoid coils for solenoids 114 and 130, and also is connected to an input of an OR gate 230. The ouput of gate 230 energizes the solenoid coil 102 to cause proper movement of the movable finger 81 so that it will move over to align with the guide for the A category storage magazine. The energizing of the solenoid 130 causes the associated sort gate rod 134 to be retracted in the A category to permit a chip to pass down along the guide finger 94A.

The energizing of the solenoid 114 retracts the controlled stop finger for the pivoting lever 97, and the energizing of the solenoid 102 causes the lever 97 to be shifted way over to the side past the stop finger for solenoid 114 causing the shaft 96 to pivot all the way over so that the guide finger 81 will align with the guide 94A and any chip coming down from the test station will slide into the proper magazine.

The output of the OR gate 230 also is connected to an input of an OR gate 231. The output of the OR gate 231 is connected through a suitable amplifier to energize the chip release solenoid coil 54 retracting the slide 52 and letting the tested chip fall down. As stated previously, the selector finger would be in the proper position so that the unit would go into an A category and the chip will then just slide down along this finger and through the magazine adapter, along the guide finger 94, and into the proper magazine 83A.

The signal from the output of OR gate 231 is also connected along a line 232 to the reset input of a flip flop 203. This means that timer 195 will not be started until the flip flop 203 is again set. The transmission gate 204 will not permit a signal to pass until the inputs to OR gate 229 are all low and the second signal to AND gate 193A necessary to set the flip flop 203 will not be provided by amplifier 194 until the tested chip has left the area controlled by photocell 150 and sensor 150A. Thus, the flip flop 203 will not be set until the signal from the OR gate 231 has been reduced to its low level (after the sorting has occurred) which will also relax the solenoid 54 and let that solenoid return to its normal position so that the slide 50 will be in position to intercept the chip dropping down in the test station from lower escapement 40.

The dropping of the tested chip into the magazine 83A after slide 50 is released will cause the chip to pass in front of the appropriate photocell 190A, causing a momentary pulse to be present at the collector of the photo sensitive transistor 192A. This pulse will cause a high level signal to appear on line 214A, which resets the flip flop 215A so that the signal to AND gate 221A and on line 228A will be low. The sort signal will also be low on the line 225 so that the output of AND gate 224A will have ceased. The test circuitry will be selected to give a pulse of desired length for the sort signal. Also the lack of a ready to test signal can be used as a control to cease the sort signals. This means that the signals that energized the solenoids 102, 114, 130 and 154 from AND gate 221A and OR gates 230 and 231 will be removed and these solenoids will be relaxed. The resetting of the flip flop 215A will cause the sort error signal light 227A to go out showing that the tested chip was properly sorted. It is the pulse caused by the chip passing between the photocell 190A and its sensor 192A that is used for resetting the circuitry. The pulse on line 222A is not of sufficient duration to cause the shift register 223 to shift from the A section to the B section.

When the signal from inverting OR gate 229 goes high the transmission gate 204 will pass a signal through OR gate 193 to AND gate 193A, and with the signal from amplifier 194 indicating no chip in test position the escapement solenoids will be actuated. A chip will drop into place, the contacts will close and a ready to test signal will be provided for automatic operation. The switch 201 is released and opened once the cycle is started.

Once the tube 83A is full, so that a chip always is blocking photocell 190A, then the signal will be high on the line 214A because the transistor 192A will no longer be conducting, and the signals on lines 220A and 222A will be low. This longer signal will cause the shift register to inactivate portion A and energize portion B which is for operation of the tube B. The high singal on line 222B will cause a high output of portion B to the input of gate 224B. Then any sort 1 signal that is received along line 225 will cause the output of the AND gate 224B to be high. This will deliver a high signal to an OR gate 234. This will set the flip flop 215B, thereby energizing the feed error light 227B, the line 228B and OR gate 229. The output of AND gate 221B is fed to one input of OR gate 230, which energized the solenoid 128 which retracts the rod 134B for the B category sort gate, and the solenoid 102 pivots the sort finger 81 to its proper position to align with the guide 94B. the output of OR gate 230 also energizes solenoid 54 through OR gate 231 and any chip then being released will drop into the B category magazine. The dropping of the tested chip past the photocell 190B resets the circuitry as previously described in connection with the A category. Once the B tube is full, so that the photocell 190B is blocked, the section B of the shift register 223 will energize the section D so that sequentially the storage tubes or magazines A, B, D and E will be filled when the thumb wheel switches are positioned as shown.

It should be noted that there are also shift registers 235 for the sort 2 category, 236 for the sort 3 category, 237 for the sort 4 category and 238 for the sort 5 category. By setting the thumb wheel switches to the respective lines to the individual sections of the registers, the sort mechanism can be made to deliver chips to any magazine from a signal from any one of the sort categories except that the A magazine can only receive chips from sort 1 signal, and the C magazine can not receive sort 1 signal.

now, assuming that the units are set as shown, so that the switch 218C for the C magazine is set to the sort 2 signal, it should be noted that the signal along line 220C is provided to one input of the AND gate 221C, and the flip flop 215C will be assumed to be in its reset stage.

The line 240C (for the B terminal of the switches 218) will be a high level with the thumb wheel switch 218C set as shown. The lines 240 lead to the respective sections of the shift register 235 and 240C leads to the C section of the shift register 235. A high output will be present from the C section onto one input of AND gate 241C with a sort 2 signal present. The output of the AND gate 241C will be high and will be applied to one input of an OR gate 242, and the output of the OR gate then will set the flip flop 215C. The inputs to OR gate 242 lead to the AND gates from the section of the respective registers. The signal from the output of the flip flop 215C will light the sort error light 227C, and a signal will be provided along line 228C to the input of OR gate 229, and the output of the AND gate 221C (high because of a high signal on line 220C) will then be provided to one of the inputs of the OR gate 231 energizing the release solenoid 54, and the signal also will be used for energizing the solenoid 127 to retract the sort gate rod 134 controlled by solenoid 127 into its retracted position. There are no sort solenoids which need to be energized of the finger 81 in this category because the C magazine is in the center position where the spring return of the finger will normally be resting. Then, once the release solenoid 127 is energized to that the slide 52 is retracted, the chip will drop straight down into the C magazine. This will of course cause the momentary reset pulse when the chip passes the photocell 190C resetting the flip flop 215C and the rest of the circuitry. The cycle will repeat.

It is therefore apparent that by selecting the position of the thumb wheel switches, the sorting function can be greatly varied. If all five different sort signals are not to be used, then more than one of the storage magazines can be used for serially accepting chips sorted from the other sort signals. For example, magazines 83D and 83E could be used for accepting category 2 sorts. By setting the thumb wheel switches 218D and 218E to the second terminal connected to the lines 240D and 240E once the C section of the shift register 235 has been shifted the D section would next take over, and when 192D was not conducting because the magazine 83D was full, causing the amplifier 216D to deliver a low signal to the D section of the shift register 235, the E section would take over, and the sorting mechanism would then be used for energizing the solenoids for moving the movable finger over to the side aligning with guide 94E.

It should also be noted that the flip flop 215D is set from by the output of an OR gate 250, which has its inputs connected to the output of AND gates 224D, 241D, 251D, 252D and 253D. The output of the flip flop 215D will cause one input to the AND gate 221D to be energized, and assuming that a signal is provided from the line 220D, the output of the AND gate 221D is fed into an OR gate 260, the output of which energizes the solenoid 101, and through OR gate 231 to energize solenoid 154. The output of the AND gate 221D also energizes solenoid 126, to retract the appropriate sort gate rod 134.

For the E sort category an OR gate 261 has an output that sets the flip flop 215E, and the inputs to the OR gate 261 are connected to the AND gates 224E, 241E, 251E, 252E and 253E. The output of flip flop 215E is connected to the AND gate 221E, and the output of this AND gate is fed into OR gate 260 causing energization of solenoids 100 and 54, and also directly energizes solenoids 125 and 120 for the proper shifting of the sorting mechanism, and withdrawl of the proper sort gate rod 134. The reset signals are again caused by the chip dropping between the respective photocells 190 and the sensors to provide a pulse for resetting the respective flip flops.

If five sort categories are desired, then the thumb wheel switches are set appropriately so that each of the tubes will receive one sort category. The tube full lights 217A–E are lit when the tubes are full and do pulse on when a chip drops into the respective magazine.

The OR gate 242 has its inputs connected to AND gates 251C, 252C and 253C, as well as 241C and OR 234 has its inputs connected to AND gates 251B, 252B, and 253B as well as 224B and 241B.

The exercise selecting of mode selector switch 200 permits selecting a particular sort category through switch 210, and doing so without the test circuitry 80 involved. The signal from OR gate 229 will provide a sort signal at the proper time (after each sort) and once a chip is in position it will be sorted immediately. The ready to test signal could also be used through a timer as a control for gate 210A.

In the step position of switch 200, a chip will be moved into the testing position when the switch 201 is closed. Thus individual sorting operations can be caused by momentarily pressing and releasing switch 201.

The sorter permits rapid, accurate and fail safe sorting. The interface board permits quick accomodation of the desired test circuitry and different length chips are also accomodated. Chips of different lengths cannot be intermixed, however.

What is claimed is:

1. An integrated circuit handling machine for handling and sorting integrated circuit chips, including means for supplying circuit chips to be tested in an upright column, first means to retain said column by retaining the lower chip in a holding position, a plurality of selectively operable second means each being operable to selectively retain from downward movement a second chip in said column and all chips in the column above the second chip, means to select and render operable one of said second means, each of said selectively operable second means being positioned to engage a second chip of a stack of chips of different length than the chips used with the other second means means to selectively release said first means while one of said second means is retaining a second chip to permit said lower chip to move, a chip testing station on said machine and guide means on said machine positioned to guide a released lower chip to the testing station.

2. The machine of claim 1 and a guide on said machine adjacent said column of chips, said second means comprising a movable member, and means to move said movable member into engagement with a side surface of said second chip to frictionally clamp said second chip against said guide when the second means is retaining said second chip.

3. An integrated circuit chip handler including a frame, means providing a supply of integrated circuit chips having electical leads thereon, a testing station, means to support an integrated circuit chip in said testing station, a test circuitry for connecting to said integrated circuit chip in said testing station, and an interface board removably mounted on said frame, said interface board including a plurality of movable contacts aligned with leads of an integrated circuit chip in said testing station, means to move said contacts to and from position engaging leads of said integrated circuit chip in said testing station, remote connection means for connection of remote circuitry leading from said interface board, and circuit path means on said interface board for electrically connecting said contacts and said remote connection means.

4. The combination of claim 3 wherein said last mentioned means comprises circuit paths which are not continuous between said remote connection means and said contacts, and path patch cord connection means for completing electrical connection between selected ones of said contacts and remote connection means.

5. The combination of claim 3 wherein said contacts comprise contact arms mechanically mounted on said interface board and biased to an open position, and means to move said contacts to a closed position wherein said contacts resiliently engage the leads on said integrated circuit chip held in said testing station.

6. An integrated circuit handling machine for sorting chip bodies having integrated circuits thereon in response to external test signals including means for supplying chip bodies having integrated circuits to be tested, means defining a testing position, guide means for guiding said chip bodies from the means to supply to the testing position, said guide means comprising a generally upright rib extending above the testing position so that the chip bodies having integrated circuits thereon will move under gravity along said rib when unrestrained, each of said chip bodies having contact leads extending outwardly from said chip body and arranged substantially parallel and spaced apart, said rib being of size to fit between said spaced contact leads, means to hold said chip bodies individually in testing position, test means at the testing position for connecting to the integrated circuit on a chip body in the test position through said contact leads and to provide a sort signal indicating a sort category for a tested integrated circuit, means to release the chip body having a tested integrated circuit from the retaining means, a sorting section for receiving chip bodies having tested integrated circuits, and means comprising a guide member pivotally mounted about an axis substantially perpendicular to the path of travel of a chip body having a tested integrated circuit from said testing position to said sorting section and movable between a plurality of positions, a plurality of storage means for storing chip bodies passing through said sorting section, said guide member being movable to one of its positions to guide a chip body having a tested integrated circuit from said testing position selectively to one of the plurality of storage means in response to a particular sort signal, separate means positioned between said guide member and each of said storage means to normally intercept chip bodies moving toward any individual storage means comprising a stop rod for each individual storage means, bias means to normally move said stop rods into the path of travel of a chip body moving from said sorting section toward the respective storage means associated with each of said stop rods, and means to withdraw one of the stop rods to permit passage of a chip body to an associated storage means in response to a sort signal moving the guide member to guide a chip body to that storage means.

* * * * *

UNITED STATES PATENT AND TRADEMARK OFFICE
CERTIFICATE OF CORRECTION

PATENT NO. : 3,896,935
DATED : July 29, 1975
INVENTOR(S) : Harold N. Hjelle et al.

It is certified that error appears in the above-identified patent and that said Letters Patent are hereby corrected as shown below:

Column 8, line 8 "113" should be--114--. Column 14, line 23 "222A" should be--221A--. Column 16, line 11 "now" should be--Now--; Column 16, line 27 before section insert --"C"--; Column 16, line 36 "134" should be--134C--. Column 18, line 29, (Claim 4, line 4) take out--path--.

Signed and Sealed this twenty-third Day of December 1975

[SEAL]

Attest:

RUTH C. MASON
*Attesting Officer*

C. MARSHALL DANN
*Commissioner of Patents and Trademarks*